US012658535B2

(12) United States Patent
Sun et al.

(10) Patent No.: US 12,658,535 B2
(45) Date of Patent: Jun. 16, 2026

(54) ELECTROCHEMICAL DEVICE AND ELECTRONIC DEVICE

(71) Applicant: Ningde Amperex Technology Limited, Ningde City (CN)

(72) Inventors: Jianzheng Sun, Dongguan City (CN); Xiaochen Li, Dongguan City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 1031 days.

(21) Appl. No.: 17/845,814

(22) Filed: Jun. 21, 2022

(65) Prior Publication Data

US 2023/0031705 A1     Feb. 2, 2023

(30) Foreign Application Priority Data

Jun. 21, 2021    (CN) .......................... 202110687619.4

(51) Int. Cl.
H01M 50/538          (2021.01)
H01M 10/04          (2006.01)
(Continued)

(52) U.S. Cl.
CPC ..... H01M 50/538 (2021.01); H01M 10/0431 (2013.01); H01M 50/105 (2021.01);
(Continued)

(58) Field of Classification Search
CPC ......... H01M 10/0409; H01M 10/0431; H01M 10/0587; H01M 50/296; H01M 50/547;
(Continued)

(56) References Cited

U.S. PATENT DOCUMENTS 11,404,752 B2 *   8/2022   Heo ..................... H01M 50/107
11,646,473 B2    5/2023   Jiang
(Continued)

FOREIGN PATENT DOCUMENTS

CN          203415648 U      1/2014
CN          206332097 U      7/2017
(Continued)

OTHER PUBLICATIONS

The Second Office Action mailed Feb. 11, 2023, in Chinese Application No. 202110687619.4, 12 pages including English translation.
(Continued)

*Primary Examiner* — Jeremiah R Smith
(74) *Attorney, Agent, or Firm* — XSENSUS LLP

(57)          ABSTRACT

An electrochemical apparatus includes a housing, an electrode assembly disposed inside the housing, a first tab group, and a first adapting piece electrically connected to the first tab group and extending out of the housing. The electrode assembly includes electrode plates comprising a first electrode plate and a second electrode plate, and a separator disposed between adjacent electrode plates. The first tab group includes a first connecting portion connected to the first adapting piece. The first tab group includes a plurality of first tabs connected to the first electrode plate and stacked on each other to form the first connecting portion. The first connecting portion includes a first portion. A thickness direction of the electrode assembly is defined as a first direction. In the first direction, the first portion is disposed between two adjacent layers of the electrode plates.

20 Claims, 11 Drawing Sheets

(51) Int. Cl.

| | |
|---|---|
| *H01M 50/105* | (2021.01) |
| *H01M 50/178* | (2021.01) |
| *H01M 50/533* | (2021.01) |
| *H01M 50/536* | (2021.01) |

(52) U.S. Cl.
CPC ....... *H01M 50/178* (2021.01); *H01M 50/533* (2021.01); *H01M 50/536* (2021.01); *H01M 2220/30* (2013.01)

(58) Field of Classification Search
CPC . H01M 50/538; H01M 50/533; H01M 50/536
See application file for complete search history.

(56) References Cited

U.S. PATENT DOCUMENTS

| | | | |
|---|---|---|---|
| 12,068,505 B2 | 8/2024 | Choi et al. | |
| 2011/0129707 A1 | 6/2011 | Ahn et al. | |
| 2011/0274953 A1* | 11/2011 | Hato ................... | H01M 50/538 |
| | | | 429/94 |
| 2012/0015225 A1* | 1/2012 | Hattori ................ | H01M 50/536 |
| | | | 429/153 |
| 2012/0164503 A1* | 6/2012 | Ishikawa ........... | H01M 10/0587 |
| | | | 429/94 |
| 2015/0010805 A1* | 1/2015 | Han .................... | H01M 50/533 |
| | | | 429/149 |
| 2015/0086821 A1* | 3/2015 | Watanabe ......... | H01M 10/0431 |
| | | | 429/94 |
| 2019/0089005 A1* | 3/2019 | Guo ........................ | H01M 4/70 |
| 2020/0251711 A1* | 8/2020 | Wakimoto .......... | H01M 10/052 |
| 2020/0313145 A1 | 10/2020 | Jiang | |
| 2021/0119289 A1* | 4/2021 | Mukai ................ | H01M 50/595 |
| 2021/0242545 A1* | 8/2021 | Jeong .................. | H01M 50/536 |
| 2022/0085461 A1 | 3/2022 | Choi et al. | |

FOREIGN PATENT DOCUMENTS

| | | |
|---|---|---|
| CN | 207818739 U | 9/2018 |
| CN | 111403789 A | 7/2020 |
| CN | 107431232 B | 8/2020 |
| CN | 111755657 A | 10/2020 |
| CN | 107408659 B | 11/2020 |
| CN | 112490596 A | 3/2021 |
| CN | 212810347 U | 3/2021 |
| CN | 112821014 A | 5/2021 |
| EP | 3893322 A1 | 10/2021 |
| JP | 2020098713 A | 6/2020 |
| KR | 20190064724 A | 6/2019 |
| WO | 2021085664 A1 | 5/2021 |

OTHER PUBLICATIONS

Notice of Allowance mailed Apr. 28, 2023, in Chinese Application No. 202110687619.4, 4 pages.
European Search Report mailed Dec. 7, 2022, in European Application No. 22180088.1, 7 pages.
Office Action, CN202110687619.4, May, 19, 2022, 7 pgs.

* cited by examiner

ELECTROCHEMICAL DEVICE AND ELECTRONIC DEVICE

CROSS-REFERENCE TO RELATED APPLICATIONS

This application claims priority to Chinese Patent Application Serial number 202110687619.4, filed Jun. 21, 2021, which is incorporated herein by reference in its entirety.

TECHNICAL FIELD

This application relates to the field of energy storage technologies, and in particular, to an electrochemical apparatus and an electronic apparatus including the electrochemical apparatus.

BACKGROUND

With popularity of consumer electronic products such as notebook computers, mobile phones, handheld game consoles, tablet computers, mobile power supplies, and drones, increasingly high requirements are imposed on electrochemical apparatuses (for example, lithium-ion batteries). However, energy density and safety of electrochemical apparatuses still cannot be effectively guaranteed.

SUMMARY

In view of disadvantages in the prior art, it is necessary to propose an electrochemical apparatus.

In addition, it is further necessary to provide an electronic apparatus including the electrochemical apparatus.

This application provides an electrochemical apparatus, including a housing, an electrode assembly disposed inside the housing, a first tab group, and a first adapting piece electrically connected to the first tab group and extending out of the housing. The electrode assembly includes electrode plates and a separator disposed between adjacent electrode plates. The electrode plates include a first electrode plate and a second electrode plate, and the first electrode plate, the separator, and the second electrode plate are laminated. The first tab group includes a plurality of first tabs, and the plurality of first tabs are connected to the first electrode plate. The first tab group includes a first connecting portion connected to the first adapting piece, and the plurality of first tabs are stacked on each other to form the first connecting portion. The first connecting portion includes a first portion. A thickness direction of the electrode assembly is defined as a first direction. In the first direction, the first portion is disposed between two adjacent layers of the electrode plates.

In this application, the first portion of the first connecting portion is disposed between two adjacent layers of the electrode plates, which can reduce waste of space at the head of the electrode assembly and improve energy density. Furthermore, the first portion is more stable in position, which can alleviate a problem of contact short circuit due to tabs being reversely inserted into the electrode assembly, thereby improving the safety of the electrochemical apparatus.

In some possible implementations, the electrode assembly is of a wound structure or a stacked structure.

In some possible implementations, the electrode assembly is of a wound structure. A plane passing through a winding center axis of the electrode assembly and perpendicular to the first direction is defined as a winding center plane. The first portion is disposed between two adjacent layers of the electrode plates on two sides of the winding center plane, which means that the first portion is disposed at a winding start end of the electrode assembly. Therefore, a hollow space at the winding start end is fully utilized, utilization of an internal space of the electrochemical apparatus is improved, and energy density loss caused by disposing the first portion between two adjacent layers of the electrode plates is reduced.

In some possible implementations, the electrode assembly is of a wound structure. In a winding direction, the electrode assembly includes two bent sections and a first section disposed between the two bent sections. In the first direction, the first portion is disposed between two adjacent layers of the electrode plates of the first section.

In some possible implementations, the electrochemical apparatus further includes a bonding piece. The bonding piece bonds the first portion and an electrode plate closest to the first portion in the first direction. In the first direction, a projection of the first portion is located in a projection of the bonding piece. A first bonding piece is configured to reduce a risk of short circuit due to the separator being pierced by burrs or welding marks generated in welding the first portion.

In some possible implementations, in the first direction, the first portion is disposed between two adjacent layers of separators. The electrochemical apparatus further includes a bonding piece. The bonding piece bonds the first portion and a separator closest to the first portion in the first direction. In the first direction, a projection of the first portion is located in a projection of the bonding piece. A first bonding piece is configured to reduce a risk of short circuit due to the separator being pierced by burrs or welding marks generated in welding the first portion.

In some possible implementations, a direction in which the plurality of first tabs extend out of the electrode plate is defined as a second direction. In the second direction, an edge of the bonding piece extends beyond an edge of the electrode assembly. Therefore, the electrode assembly can be effectively separated from the first portion, which further reduces the risk of short circuit due to burrs or welding marks of the first portion piercing the separator.

In some possible implementations, an electrode plate closest to the first portion in the first direction is the first electrode plate. The first electrode plate includes a first current collector and a first active material layer disposed on a surface of the first current collector. The plurality of first tabs are connected to the first current collector. The first current collector includes a first surface facing toward the first portion and a second surface back away from the first surface. The first active material layer is disposed on the first surface and the second surface. The first active material layer disposed on the first surface is provided with a recess, and in the first direction, a projection of the first portion is located in a projection of the recess. Provision of the recess is used to offset an increase in total thickness of the electrochemical apparatus at the corresponding first portion due to arrangement of the first portion between two adjacent layers of the electrode plates, thereby reducing the total thickness of the electrochemical apparatus at the corresponding first portion.

In some possible implementations, an electrode plate closest to the first portion in the first direction is the first electrode plate. The first electrode plate includes a first current collector and a first active material layer disposed on a surface of the first current collector. The plurality of first tabs are electrically connected to the first current collector.

The first current collector includes a first surface facing toward the first portion and a second surface back away from the first surface. The first active material layer is disposed on the first surface and the second surface. A direction in which the plurality of first tabs extend out of the electrode plate is defined as a second direction. In the second direction, the active material layer disposed on the first surface includes a first area and a second area, and the first area is disposed between the plurality of first tabs and the second area. A thickness of the first area is less than a thickness of the second area. In the first direction, a projection of the first portion is located in a projection of the first area. Provision of the first area is used to offset an increase in total thickness of the electrochemical apparatus at the corresponding first portion due to arrangement of the first portion between two adjacent layers of the electrode plates, thereby reducing the total thickness of the electrochemical apparatus at the corresponding first portion.

In some possible implementations, the first portion is configured to be a U-shaped structure, and at least a part of the first adapting piece is disposed in a space constrained by the U-shaped structure.

In some possible implementations, a direction in which the plurality of first tabs extend out of the first electrode plate is defined as a second direction. The first connecting portion extends in the second direction. Therefore, the thickness of the first connecting portion in the first direction is smaller, helping reduce the total thickness of the electrochemical apparatus, and helps reduce required thickness offset due to arrangement of the first portion between two adjacent layers of the electrode plates.

In some possible implementations, the first tab group further includes a second connecting portion. The second connecting portion is connected between the first electrode plate and the first connecting portion. The second connecting portion is disposed on a side of the winding center plane.

In some possible implementations, the electrochemical apparatus further includes a second tab group. The first adapting piece is electrically connected to the second tab group. The second tab group includes a plurality of second tabs, and the plurality of second tabs are connected to the first electrode plate. The second tab group includes a third connecting portion connected to the first adapting piece, and the plurality of second tabs are stacked on each other to form the third connecting portion. The third connecting portion includes a second portion. In the first direction, the second portion is disposed between two adjacent layers of the electrode plates. At least a part of the first adapting piece is disposed between the first portion and the second portion. With addition of the plurality of second tabs, the number of tabs connected to the first electrode plate is further increased, helping further reduce internal resistance of the first electrode plate and improve charge and discharge rates of the electrochemical apparatus.

This application further provides an electronic apparatus, including the electrochemical apparatus described above.

Figure 1:
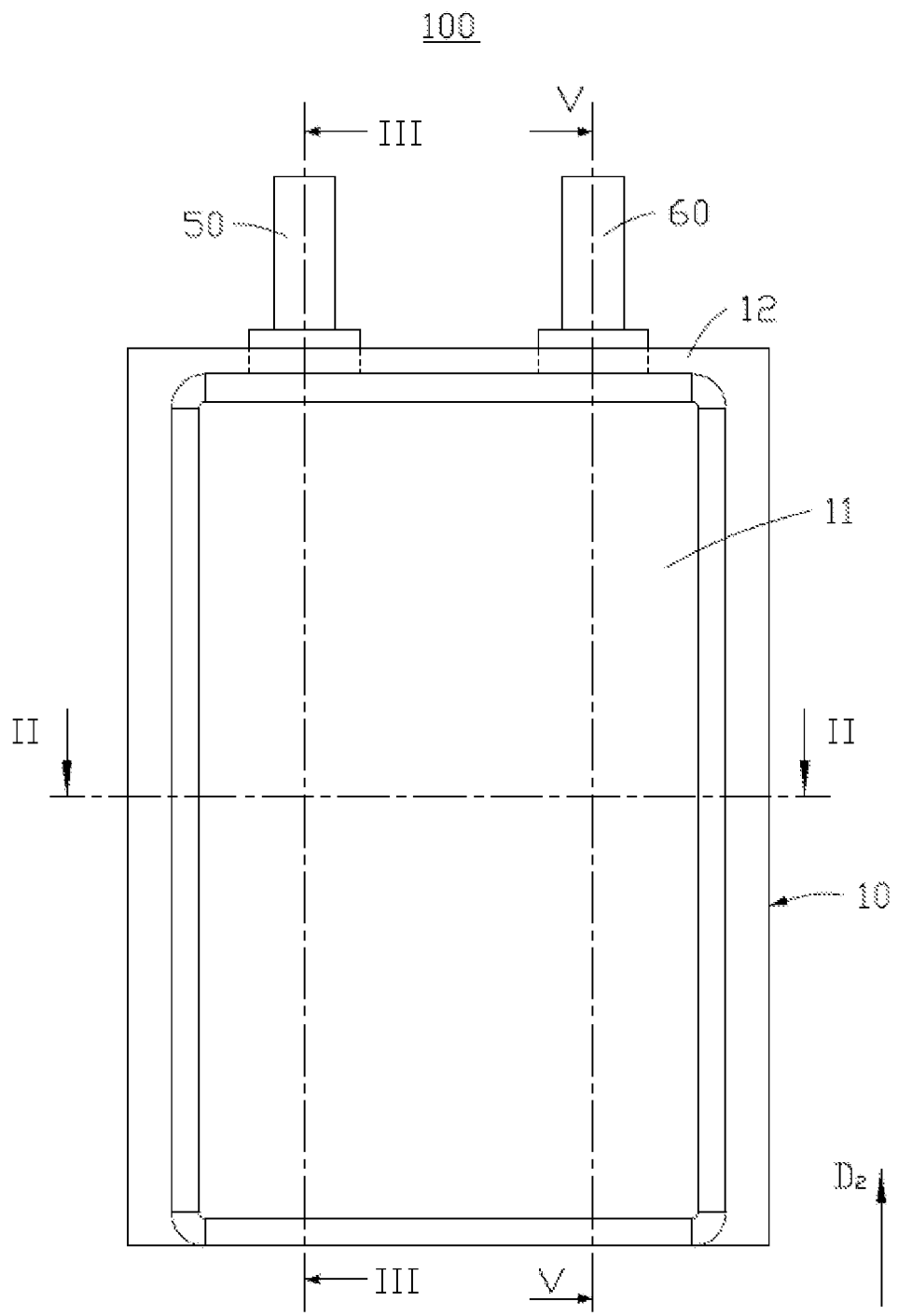
FIG. 1 is a front view of an electrochemical apparatus according to an embodiment of this application.

| Reference signs of main components: | |
| --- | --- |
| Electronic apparatus | 1 |
| Housing | 10 |
| Body | 11 |
| Sealing edge | 12 |
| Electrode assembly | 20 |
| First electrode plate | 21 |
| Second electrode plate | 22 |
| Separator | 23 |
| First tab group | 30 |
| First tab | 31 |
| Third tab group | 40 |
| Third tab | 41 |
| First adapting piece | 50 |
| Second adapting piece | 60 |
| First bonding piece | 70 |
| Second bonding piece | 80 |
| Second tab group | 90 |
| Second tab | 91 |
| Electrochemical apparatus | 100, 200, and 300 |
| First section | 201 |
| Second section | 202 |
| First bent section | 203 |
| Second bent section | 204 |
| First current collector | 211 |
| First active material layer | 212 |
| Second current collector | 221 |
| Second active material layer | 222 |
| First connecting portion | 301 |
| Second connecting portion | 302 |
| Third connecting portion | 901 |
| Fourth connecting portion | 902 |
| First surface | 2111 |
| Second surface | 2112 |
| Recess | 2120 |
| First area | 2121 |
| Second area | 2122 |
| First portion | 3010 |
| First sub-portion | 3011 |
| Second sub-portion | 3012 |
| Third sub-portion | 3013 |
| Second portion | 9010 |
| Edge | 231, 701, 2101, 2201 |
| Space | S |
| Winding direction | D |
| First direction | $D_1$ |
| Second direction | $D_2$ |

-continued

| Reference signs of main components: | |
| --- | --- |
| Winding center axis | C |
| Winding center plane | P |
| Size | d1 |
| Width | W |

This application will be further described with reference to the accompanying drawings in the following specific embodiments.

DESCRIPTION OF EMBODIMENTS

The technical solutions in the embodiments of this application are clearly described below in detail. Apparently, the described embodiments are only some rather than all of the embodiments of this application. Unless otherwise defined, all technical and scientific terms used herein shall have the same meanings as commonly understood by those skilled in the art to which this application belongs. The terms used in the specification of this application are merely intended to describe specific embodiments but not intended to constitute any limitation on this application.

The following describes the embodiments of this application in detail. However, this application may be embodied in many different implementations and should not be construed as being limited to the example embodiments set forth herein. Rather, these example embodiments are provided so that this application can be conveyed to those skilled in the art thoroughly and in detail.

In addition, in the accompanying drawings, sizes or thicknesses of various components and layers may be exaggerated for brevity and clarity. The thickness of this application refers to the average thickness, which can be averaged by multiple sampling measurements. Throughout the text, the same numerical values represent the same elements. As used herein, the term "and/or" includes any and all combinations of one or more of the associated listed items. In addition, it should be understood that when an element A is referred to as being "connected to" an element B, the element A can be directly connected the element B or an intervening element C may be present therebetween such that the element A and the element B are indirectly connected to each other.

Further, the use of "may" when describing embodiments of this application relates to "one or more embodiments of this application."

The terminology used herein is merely intended to describe specific embodiments but not intended to constitute any limitation on this application. As used herein, the singular forms are intended to include the plural forms as well, unless the context clearly indicates otherwise. It should be further understood that the terms "comprise" or "include" and variations thereof, when used in this specification, specify the presence of stated features, numbers, steps, operations, elements, and/or components but do not preclude the presence or addition of one or more other features, numbers, steps, operations, elements, components, and/or groups thereof.

Spatial related terms such as "above" may be used herein for ease of description to describe the relationship between one element or feature and another element (a plurality of elements) or feature (a plurality of features) as illustrated in the figure. It should be understood that spatial related terms are intended to encompass different orientations of a device or an apparatus in use or operation in addition to the orientations depicted in the figures. For example, if the device in the figures is turned over, elements described as "above" or "over" other elements or features would then be oriented "below" or "beneath" the other elements or features. Thus, the example term "above" can encompass both an orientation of above and below: It should be understood that although the terms first, second, third, or the like may be used herein to describe various elements, components, areas, layers, and/or portions, these elements, components, areas, layers, and/or portions should not be limited by these terms. These terms are used to distinguish one element, component, region, layer, or portion from another element, component, region, layer, or portion. Therefore, the first element, component, region, layer, or portion discussed below may be referred to as the second element, component, region, layer, or portion without departing from the teachings of the example embodiments.

Figure 2:
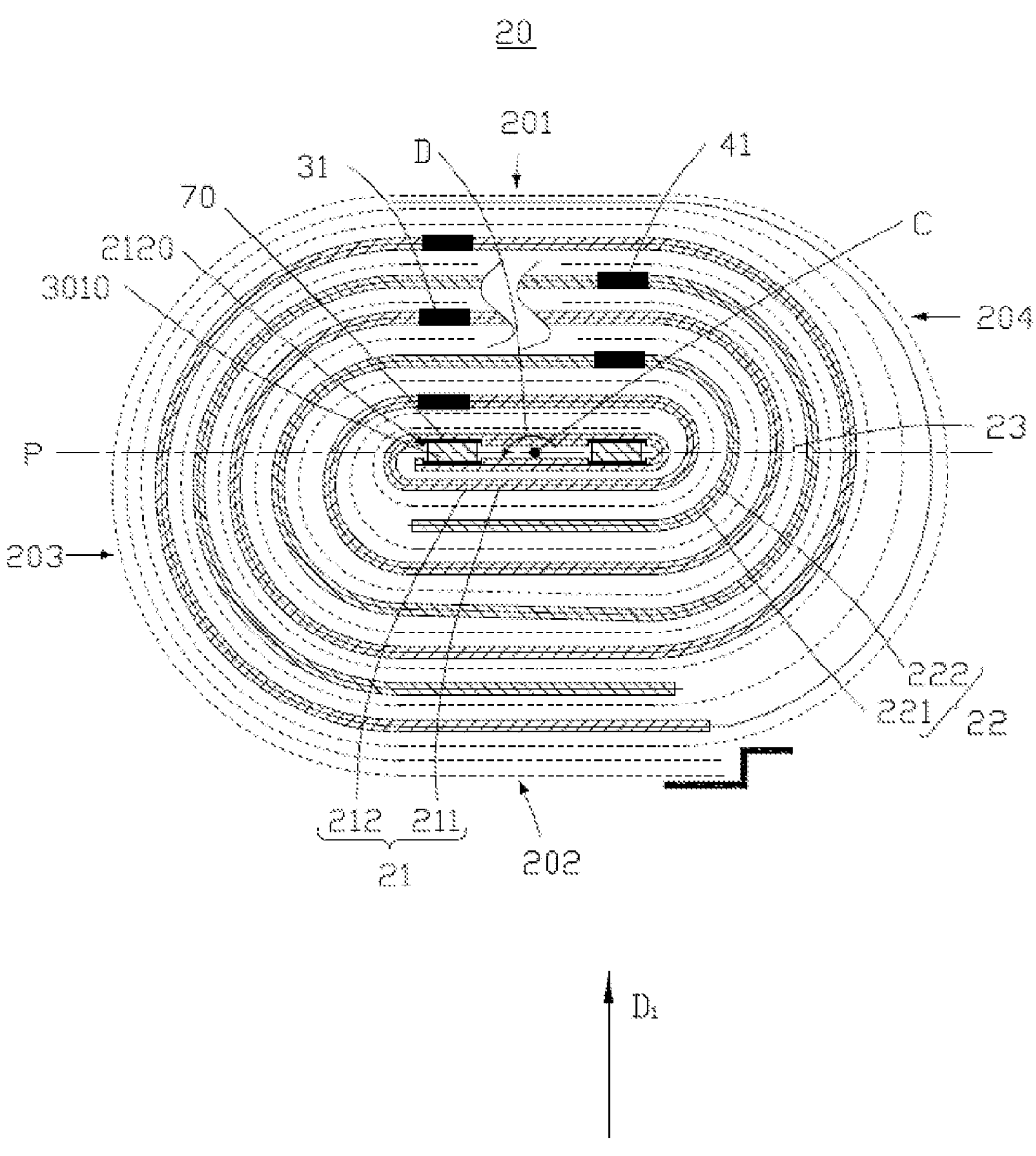
FIG. 2 is an II-II cross-sectional view of the electrochemical apparatus shown in FIG. 1 with a housing removed.
Figure 3:
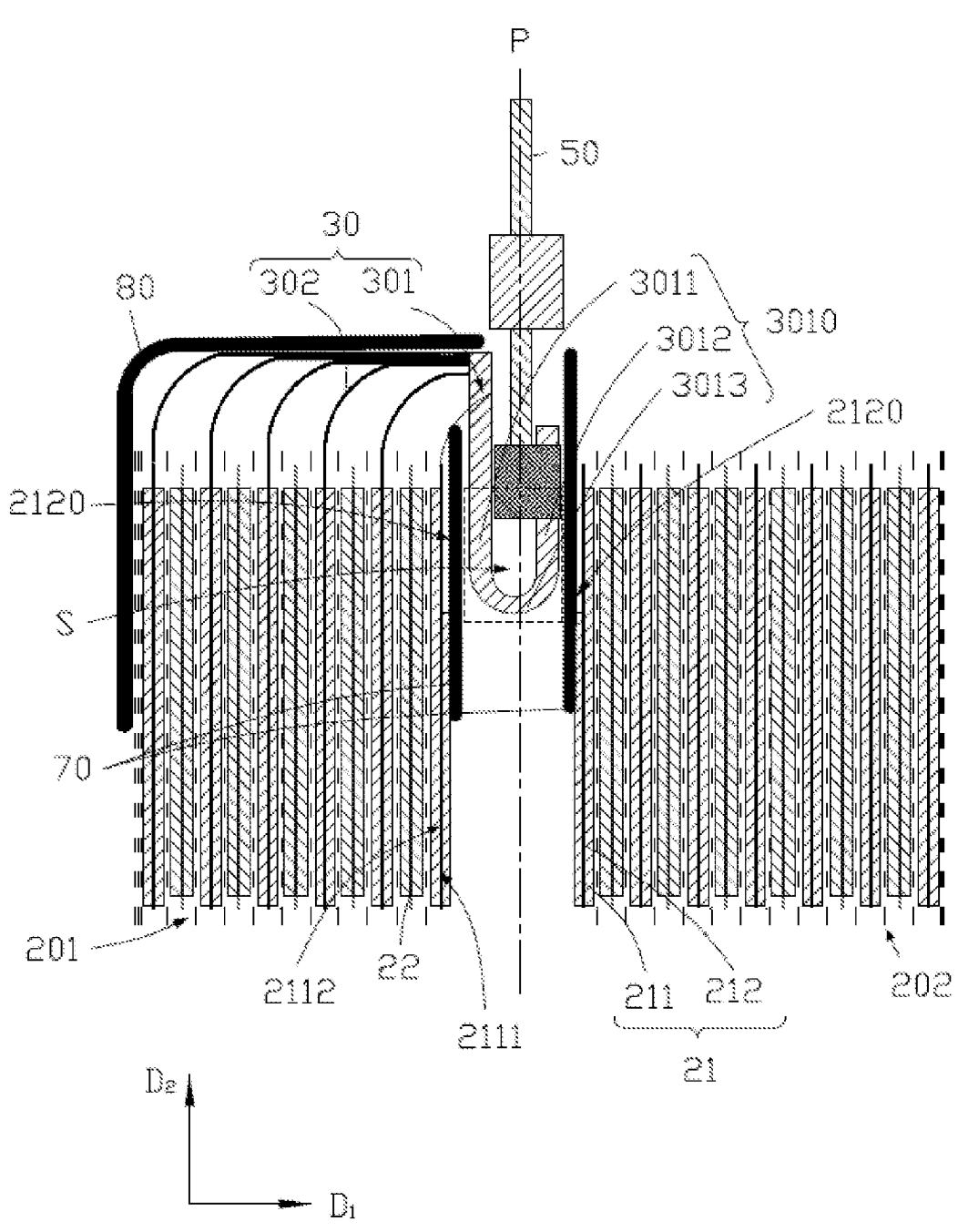
FIG. 3 is an III-III cross-sectional view of the electrochemical apparatus shown in FIG. 1 with a housing removed.

Referring to FIG. 1 to FIG. 3, an embodiment of this application provides an electrochemical apparatus 100, including a housing 10, an electrode assembly 20, a first tab group 30, a third tab group 40, a first adapting piece 50, and a second adapting piece 60. The electrode assembly 20 is disposed inside the housing 10. The electrode assembly 20 includes electrode plates and a separator 23 disposed between adjacent electrode plates. Specifically, the electrode plate includes a first electrode plate 21 and a second electrode plate 22. The separator 23 is disposed between the first electrode plate 21 and the second electrode plate 22. The separator 23 is configured to prevent direct contact between the first electrode plate 21 and the second electrode plate 22, thereby reducing a risk of short circuit of the electrode assembly 20.

As shown in FIG. 1, in some embodiments, the housing 10 may be a package bag obtained by using a package film (such as an aluminum-plastic film) for packaging, which means that the electrochemical apparatus 100 is a pouch cell battery. The housing 10 includes a body 11 for accommodating the electrode assembly 20 and an sealing edge 12 connected to the body 11. In some other embodiments, the electrochemical apparatus 100 is not limited to a pouch cell battery, and may alternatively be a steel-shell battery or an aluminum-shell battery, which is not limited in this application.

As shown in FIG. 2, in some embodiments, the electrode assembly 20 is of a wound structure, that is, the first electrode plate 21, the separator 23, and the second electrode plate 22 are sequentially laminated and wound to form the electrode assembly 20. In some other embodiments, the electrode assembly 20 may alternatively be of a stacked structure, that is, the first electrode plate 21, the separator 23, and the second electrode plate 22 are sequentially stacked and wound to form the electrode assembly 20.

The first electrode plate 21 includes a first current collector 211 and a first active material layer 212 disposed on the first current collector 211. The second electrode plate 22 includes a second current collector 221 and a second active material layer 222 disposed on the second current collector 221. In some embodiments, the first electrode plate 21 is a negative electrode plate, and the second electrode plate 22 is a positive electrode plate. The first current collector 211 may be, but is not limited to, a metal foil such as a copper foil or a nickel foil. The second current collector 221 may be, but is not limited to, a metal foil such as an aluminum foil or a nickel foil.

The first tab group 30 includes a plurality of first tabs 31, and the plurality of first tabs 31 are connected to the electrode plate. In some embodiment, the plurality of first tabs 31 are connected to the first electrode plate 21. Specifically, the plurality of first tabs 31 are connected to the first current collector 211 of the first electrode plate 21. More specifically, the plurality of first tabs 31 may be integrally formed with the first current collector 211 (in other words, the first tabs 31 are formed by cutting the first current collector 211). The first adapting piece 50 is electrically connected to the first tab group 30 and extends out of the edge banding 12 of the housing 10 to connect an external component (not shown in the figure). The plurality of first tabs 31 are provided, helping reduce internal resistance of the first electrode plate 21 and improve charge and discharge rates. The electrode assembly 20 has a first direction $D_1$ and a second direction $D_2$. The first direction $D_1$ is a thickness direction of the electrode assembly 20. The second direction $D_2$ is a direction in which the first tab 31 extends out of the electrode plate. In some embodiments, the second direction $D_2$ may be a length direction of the electrode assembly 20.

Figure 5:
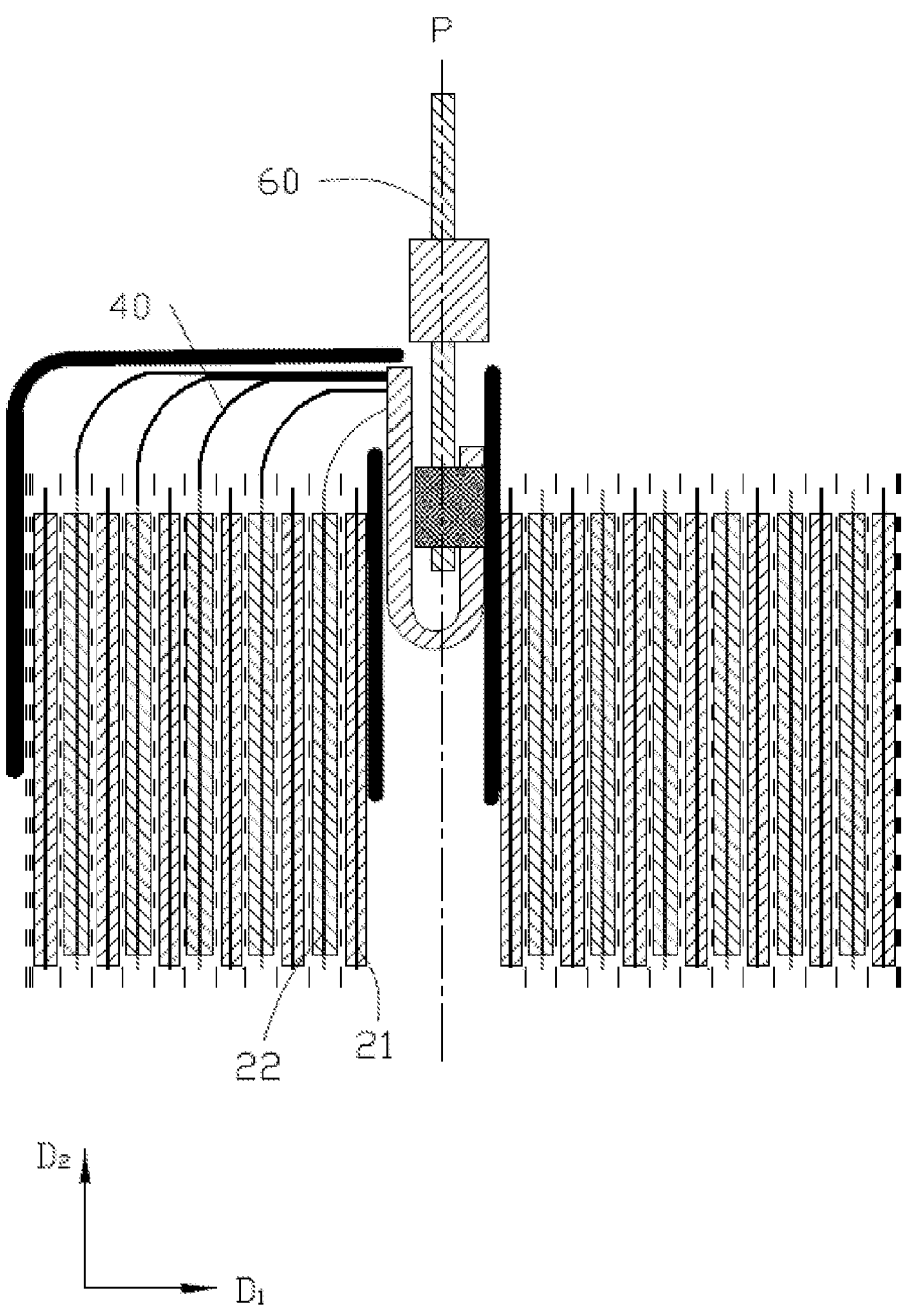
FIG. 5 is a V-V cross-sectional view of the electrochemical apparatus shown in FIG. 1 with a housing removed.

As shown in FIG. 2 and FIG. 5, the third tab group 40 includes a plurality of third tabs 41, and the third tabs 41 and the first tabs 31 have opposite polarities. The plurality of third tabs 41 are connected to the second electrode plate 22. Specifically, the plurality of third tabs 41 are connected to the second current collector 221 of the second electrode plate 22. More specifically, the plurality of third tabs 41 may be integrally formed with the second current collector 221. The second adapting piece 60 is electrically connected to the third tab group 40 and extends out of the sealing edge 12 of the housing 10 to connect an external component.

As shown in FIG. 3, the first tab group 30 includes a first connecting portion 301 and a second connecting portion 302. The first connecting portion 301 is connected to the first adapting piece 50, and the second connecting portion 302 is connected between the first electrode plate 21 and the first connecting portion 301. A plurality of first tabs 31 are stacked on each other to form the first connecting portion 301. In some embodiments, the plurality of first tabs 31 are stacked on each other and welded to form the first connecting portion 301. The first connecting portion 301 includes a first portion 3010. In the first direction $D_1$, the first portion 3010 is disposed between two adjacent layers of the electrode plates. In order to reduce a risk of contact short circuit between the first portion 3010 and two adjacent layers of the electrode plates, a polarity of the two adjacent layers of the electrode plates located on two sides of the first portion 3010 may be the same as a polarity of the first portion 3010 (that is, a polarity of the first tab 31). For example, when the first tab 31 is a negative tab, two adjacent layers of the electrode plates located on two sides of the first portion 3010 may both be the first electrode plates 21.

A structure of the third tab group 40 may be similar to that of the first tab group 30, and details are not described herein again.

In the electrochemical apparatus with a plurality of tabs, straight-out tabs may take up space at the head of the electrode assembly, reducing the energy density of the electrochemical apparatus. Therefore, before being welded to the adapting piece, the tabs need to be bent. Subsequently, the adapting piece needs to be inserted into the housing to a preset position so as to be welded with the bent tabs. However, the bent tabs are likely to be reversely inserted into the electrode assembly in a direction towards the electrode assembly under the action of the adapting piece. A position at which the tab is reversely inserted is uncertain. If the reversely inserted tab is in contact with an electrode plate with a different polarity, a short circuit or even smoke and fire may occur in the electrochemical apparatus, causing failure and reducing use safety of the electrochemical apparatus.

In this application, the first portion 3010 of the first connecting portion 301 is disposed between two adjacent layers of the electrode plates, which can reduce waste of space at the head of the electrode assembly 20 and improve energy density. In addition, the first portion 3010 in the second direction $D_2$ is more stable in position, and is not easy to be reversely inserted under the action of the first adapting piece 50, which can alleviate a problem of contact short circuit due to reverse insertion of a tab, and improve the safety of the electrochemical apparatus 100. In addition, for the electrode assembly 20 with the plurality of first tabs 31, a thickness of the electrode assembly 20 on a side of which the plurality of first tabs 31 extend out is reduced to some extent. Arrangement of the first portion 3010 in this application also helps offset the thickness of the electrode assembly 20 on the side of which the plurality of first tabs 31 extend out and strengthen an interface between the first electrode plate 21 and the second electrode plate 22 to reduce a risk of lithium plating.

As shown in FIG. 2, in some embodiments, the electrode assembly 20 is of a wound structure. In a winding direction D, the electrode assembly 20 includes a first section 201, a first bent section 203, a second section 202, and a second bent section 204 that are connected in sequence. In some embodiments, the first section 201 and the second section 202 may be flat and straight sections arranged in parallel. In some other embodiments, the first section 201 and the second section 202 may alternatively be bent sections, which is not limited in this application. The electrode assembly 20 has a winding center axis C perpendicular to a paper plane. The winding direction D is a direction of rotating counterclockwise around the winding center axis C as shown in FIG. 2. In this case, the first direction $D_1$ of the electrode assembly 20 specifically is a direction from the second section 202 to the first section 201.

As shown in FIG. 2 and FIG. 3, in some embodiments, a plane passing through a winding center axis C of the electrode assembly 20 and perpendicular to the first direction $D_1$ is defined as a winding center plane P. The first portion 3010 is disposed between two adjacent layers of electrode plates on two sides of the winding center plane P, which means that the first portion 3010 is disposed between a two layers of electrode plates at the innermost circle of the winding structure of the electrode assembly 20. It can be understood that, during preparation of the electrode assembly 20, by using a winding pin (not shown in the figure), the first electrode plate 21, the separator 23, and the second electrode plate 22 can be laminated and wound around the winding pin. After the winding is completed, the winding pin is drawn out, leaving a hollow space at a winding start end of the electrode assembly 20. With the first portion 3010 disposed at the winding start end of the electrode assembly 20, the foregoing hollow space at the winding start end is fully utilized, utilization of an internal space of the electrochemical apparatus 100 is improved, and energy density loss caused by disposing the first portion 3010 between two adjacent layers of electrode plates is reduced.

Figure 6:
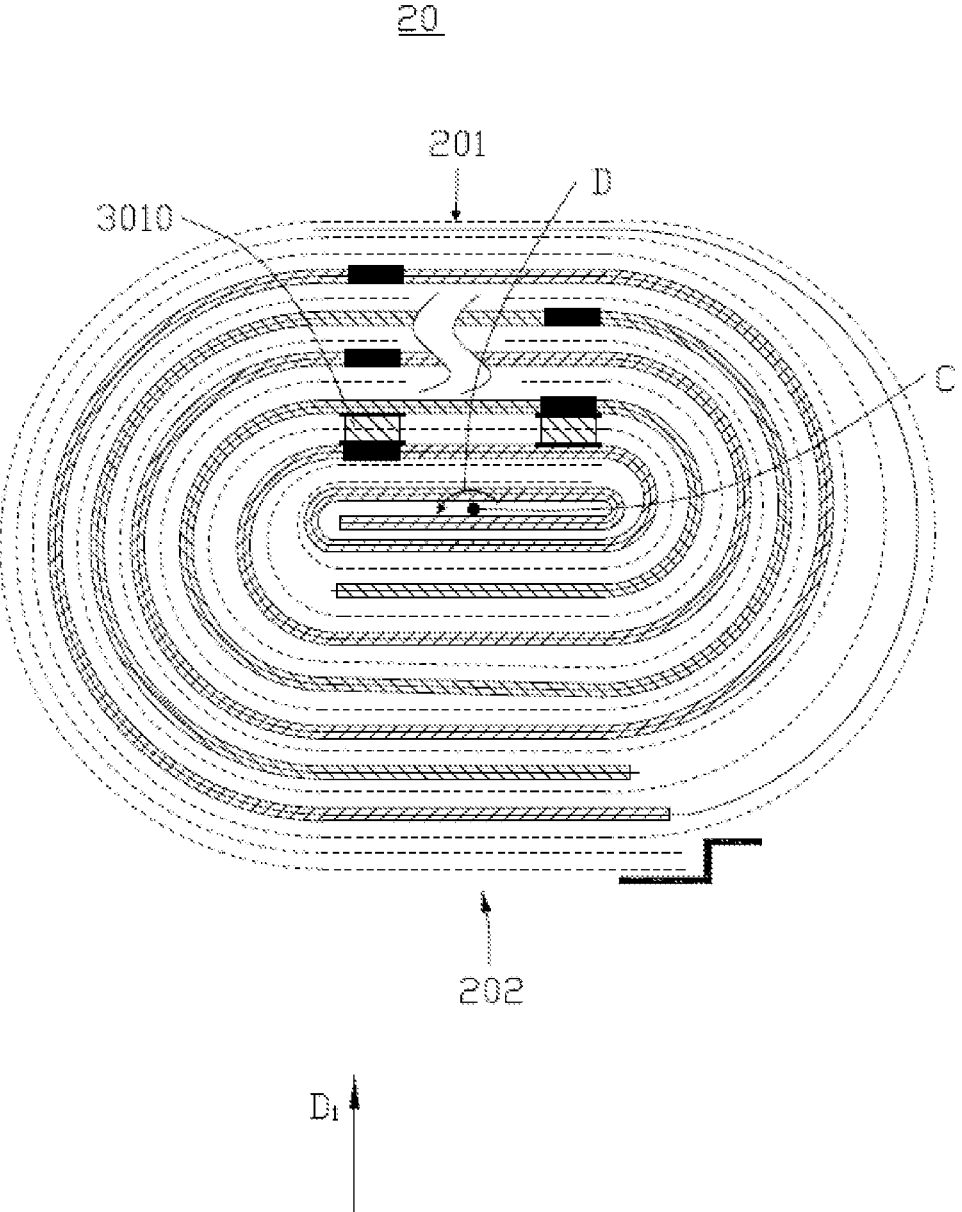
FIG. 6 is a cross-sectional view of the electrochemical apparatus shown in FIG. 1 with a housing removed in some other embodiments.

As shown in FIG. 6, in some other embodiments, a specific position of the first portion 3010 may alternatively be changed. For example, in the first direction $D_1$, the first portion 3010 may be disposed between two adjacent layers of the electrode plates of the first section 201 or the second section 202. The two adjacent layers of the electrode plates of the first section 201 or the second section 202 have opposite polarities.

As shown in FIG. 3, in some embodiments, an electrode plate of the electrode assembly 20 is closest to the first portion 3010 in the first direction $D_1$. The electrochemical apparatus 100 further includes a first bonding piece 70. The first bonding piece 70 bonds the first portion 3010 and the electrode plate closest to the first portion 3010 in the first direction $D_1$. In the first direction $D_1$, a projection of the first portion 3010 is located in a projection of the first bonding piece 70. As shown in FIG. 3, the number of the first bonding pieces 70 may be two. In the first direction $D_1$, one first bonding piece 70 is provided on each of two opposite sides of the first portion 3010. It can be understood that burrs may be produced when the plurality of first tabs 31 are formed by cutting the first current collector 211, that burrs or welding marks may also be produced when the plurality of first tabs 31 of the first portion 3010 are welded, and that the foregoing burrs or welding marks may pierce the separator 23 at the electrode plate side, thereby causing short circuit. With the first bonding piece 70 being disposed on the first portion 3010, a risk of short circuit due to the separator 23 being pierced by burrs or welding marks of the first portion 3010 can be reduced. The first bonding piece 70 may be a single-sided adhesive tape, double-sided adhesive tape, or hot melt adhesive.

Figure 4:
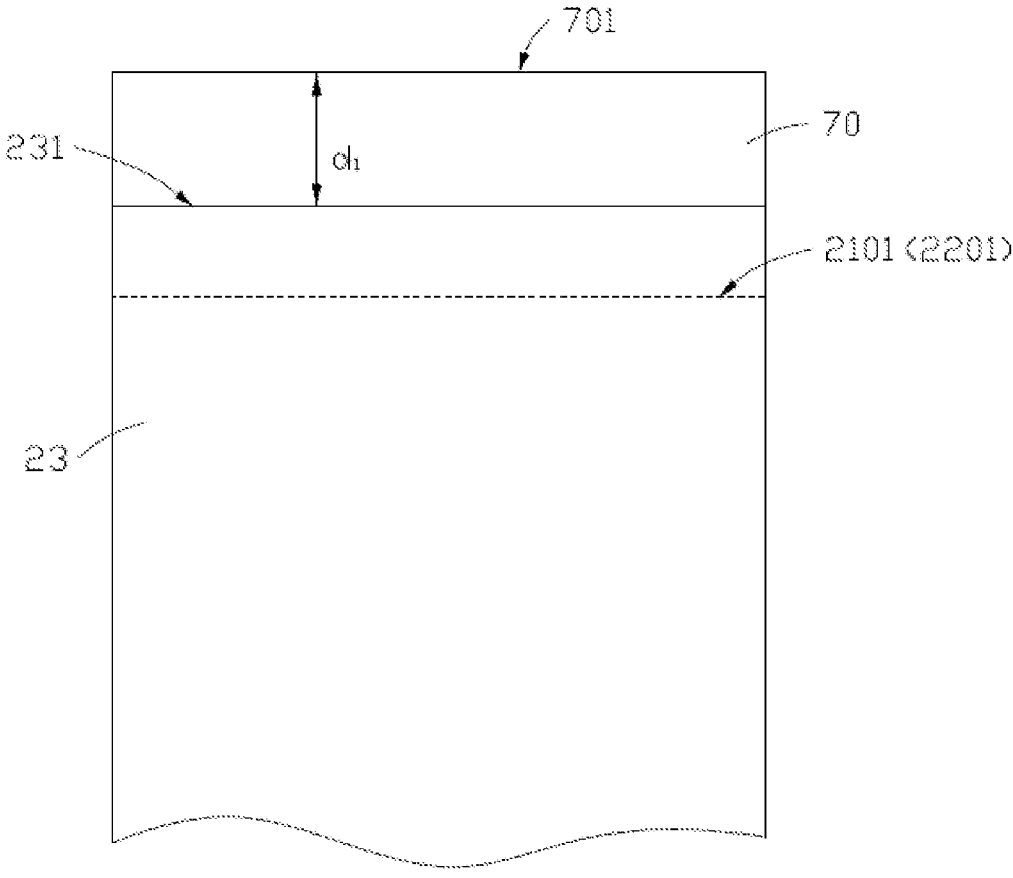
FIG. 4 is a left view of the electrochemical apparatus shown in FIG. 1 with a housing and an adapting piece that are removed.

As shown in FIG. 3 and FIG. 4, further, in the second direction $D_2$, an edge 701 of the first bonding piece 70 may extend beyond an edge of the electrode assembly 20. To fully avoid direct contact between the first electrode plate 21 and the second electrode plate 22, in the second direction $D_2$, an edge 231 of the separator 23 extends beyond an edge 2101 of the first electrode plate 21 and an edge 2201 of the second electrode plate 22. Therefore, in the second direction $D_2$, the edge of the electrode assembly 20 is generally the edge 231 of the separator 23. An edge 701 of the first bonding piece 70 is arranged beyond the edge of the electrode assembly 20 so that the electrode assembly 20 is effectively separated from the first portion 3010, which further reduces the risk of short circuit due to burrs or welding marks of the first portion 3010 piercing the electrode plate and the separator 23. In some embodiments, the edge 701 of the first bonding piece 70 extends beyond the edge of the electrode assembly 20 by a distance d1 of 3-100 mm. It can be understood that the edge 2101 of the first electrode plate 21 and the edge 2201 of the second electrode plate 22, although shown at a same position in FIG. 4, may alternatively be at different positions.

As shown in FIG. 3, the electrochemical apparatus 100 may further include a second bonding piece 80. The second bonding piece 80 bonds an outer side of the second connecting portion 302, thereby reducing a risk of short circuit that may be caused by direct contact between the second connecting portion 302 and the housing 10. The second bonding piece 80 may be a single-sided adhesive tape, double-sided adhesive tape, or hot melt adhesive.

Figure 7:
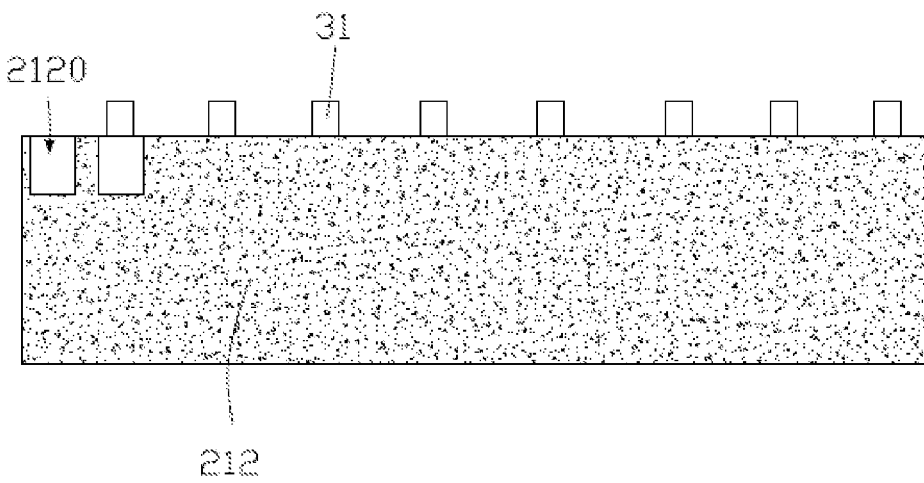
FIG. 7 is a schematic diagram of an unwound first electrode plate of the electrochemical apparatus shown in FIG. 1.

In some embodiments, as shown in FIG. 3, the electrode plate closest to the first portion 3010 is the first electrode plate 21 in the first direction $D_1$. More specifically, it is the first current collector 211 of the first electrode plate 21 or the first active material layer 212 that is closest to the first portion 3010 in the first direction $D_1$. The first current collector 211 of the first electrode plate 21 includes a first surface 2111 facing toward the first portion 3010 and a second surface 2112 back away from the first surface 2111. The first active material layer 212 is disposed on the first surface 2111 and the second surface 2112. Also referring to FIG. 7, the first active material layer 212 disposed on the first surface 2111 is provided with a recess 2120. In the first direction $D_1$, a projection of the first portion 3010 is located in a projection of the recess 2120. The recess 2120 may be configured to accommodate at least a part of the first portion 3010. With provision of the recess 2120, the thickness of the electrode assembly 20 itself at the corresponding recess 2120 is reduced, which could offset an increase in total thickness of the electrochemical apparatus 100 at the corresponding first portion 3010 due to arrangement of the first portion 3010 between two adjacent layers of the electrode plates, thereby reducing the total thickness of the electrochemical apparatus 100 at the corresponding first portion 3010. In some embodiments, in the first direction $D_1$, an edge of the recess 2120 extends beyond the edge of the first portion 3010 by a distance of 0-20 mm.

Figure 8:
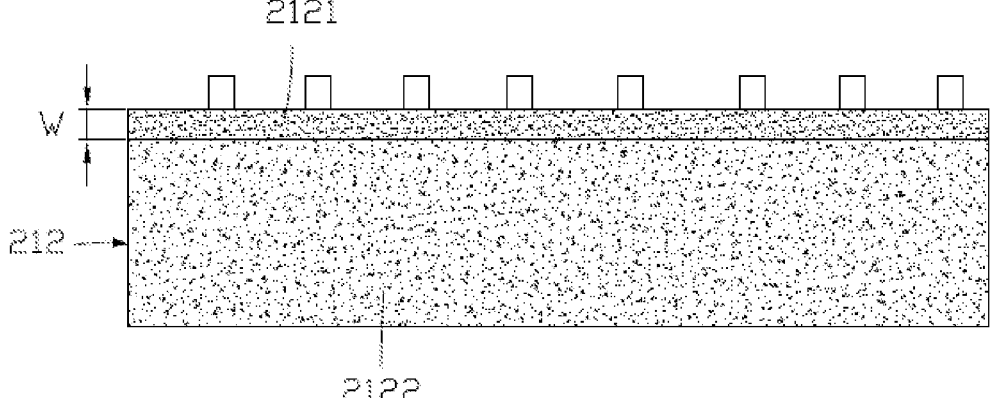
FIG. 8 is a schematic structural diagram of an unwound first electrode plate of the electrochemical apparatus shown in FIG. 1 in some other embodiments.

As shown in FIG. 8, in some other embodiments, in the second direction $D_2$, the first active material layer 212 disposed on the first surface 2111 includes a first area 2121 and a second area 2122, and the first area 2121 is disposed between the first tab 31 and the second area 2122. A thickness of the first area 2121 is less than a thickness of the second area 2122, which means that the first area 2121 is a thinned area. In the first direction $D_1$, a projection of the first portion 3010 is located in a projection of the first area 2121. With provision of the first area 2121, the thickness of the electrode assembly 20 itself at the corresponding first area 2121 is reduced, which could also offset an increase in total thickness of the electrochemical apparatus 100 at the corresponding first portion 3010 due to arrangement of the first portion 3010 between two adjacent layers of the electrode plates, and reduce a risk of lithium plating. In some embodiments, in the first direction $D_1$, a width W of the first area 2121 in the second direction $D_2$ is 5-50 mm. In the first direction $D_1$, a difference between a thickness of the second area 2122 and a thickness of the first area 2121 is 2 mm-30 μm.

As shown in FIG. 3, in some embodiments, the second connecting portion 302 is disposed on a side of the winding center plane P. In other words, the second connecting portion 302 is only connected to the first electrode plate 21 at the first section 201 or the second section 202 of the electrode assembly 20.

As shown in FIG. 3, in some embodiments, the first portion 3010 includes a first sub-portion 3011, a second sub-portion 3012 opposite to the first sub-portion 3011, and a third sub-portion 3013 bent and connected between the first sub-portion 3011 and the second sub-portion 3012. In other words, the first portion 3010 forms a U-shaped structure and defines a space S with an opening facing towards the first adapting piece 50. The first adapting piece 50 is at least partially disposed inside the space S constrained by the U-shaped structure, and may be fastened to the second sub-portion 3012 by welding.

Figure 9:
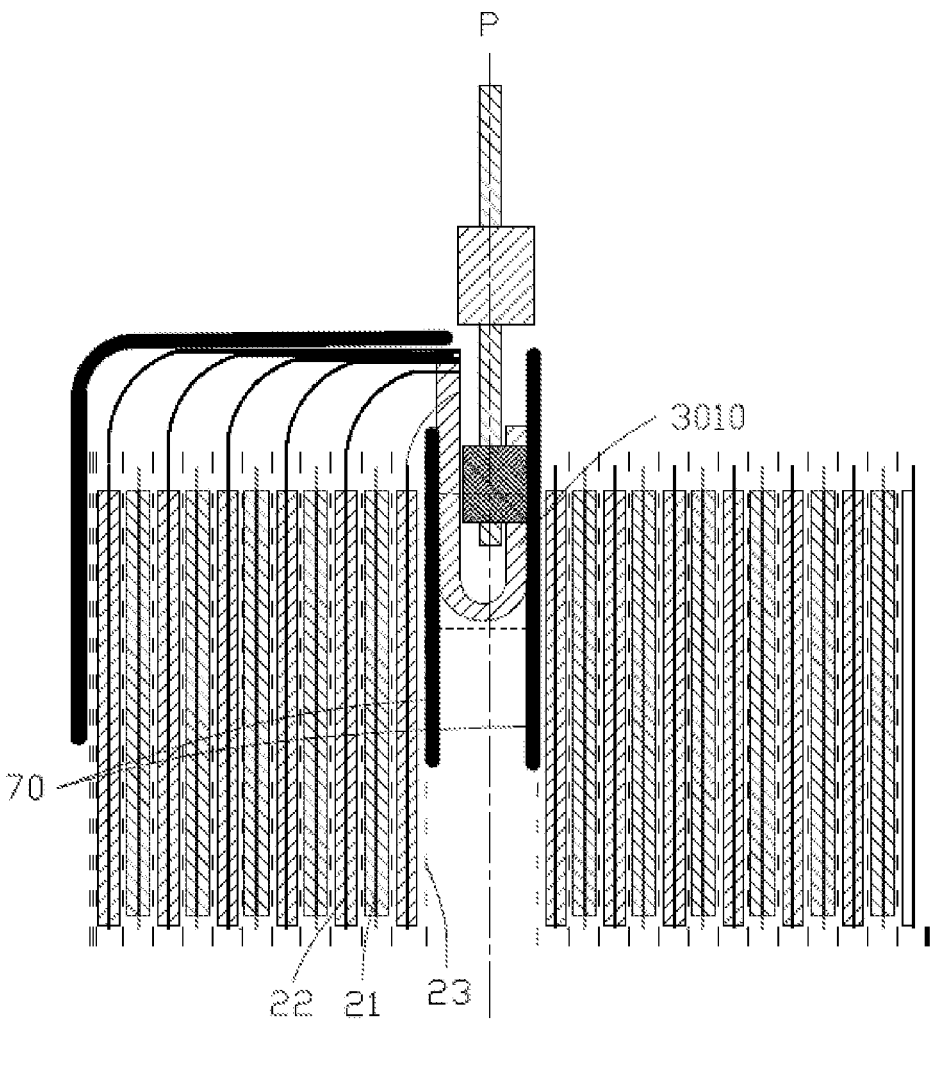
FIG. 9 is a cross-sectional view of the electrochemical apparatus shown in FIG. 1 with a housing removed in still some other embodiments.
Figure 9:
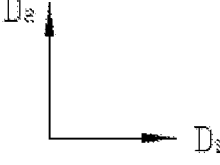

The foregoing is described under the condition that the electrode plate of the electrode assembly 20 is closest to the first portion 3010 in the first direction $D_1$. However, as shown in FIG. 9, in some other embodiments, at least one separator 23 is further provided between the first portion 3010 and each of the two adjacent layers of the electrode plates on two sides of the first portion 3010. In other words, in the electrode assembly 20, it is the separator 23 that is closest to the first portion 3010 in the first direction $D_1$. In the first direction $D_1$, the first portion 3010 is disposed between the two adjacent layers of the separators 23. In this case, the first bonding piece 70 bonds the first portion 3010 and the separator 23 closest to the first portion 3010 in the first direction $D_1$. In the first direction $D_1$, a projection of the first portion 3010 is located in a projection of the first bonding piece 70. In this case, the first bonding piece 70 can also reduce a risk of short circuit due to the separator 23 being pierced by burrs or welding marks of the first portion 3010. It can be understood that when a plurality of separators 23 are provided between the first portion 3010 and each of the two adjacent layers of the electrode plates on two sides of the first portion 3010, the first bonding piece 70 can bond one of the separators 23 that is closest to the first portion 3010 in the first direction $D_1$, or another one of the separators 23.

It can be understood that due to existence of the separators 23, polarities of the two adjacent layers of the electrode plates on two sides of the first portion 3010 may be the same as or different from the polarity of the first portion 3010 (that is, the polarity of the first tab 31). In this case, the separator 23 can separate the first portion 3010 from the electrode plate with a different polarity, thereby reducing the risk of contact short circuit. For example, the two adjacent layers of the electrode plates on two sides of the first portion 3010 may both be the first electrode plate 21 or the second electrode plate, or may be the first electrode plate 21 and the second electrode plate 22. When the electrode assembly 20 is of a stacked structure, the polarities of the two adjacent layers of the electrode plates are different, so that in the electrode assembly 20, it is preferable that the separator 23 is closest to the first portion 3010 in the first direction $D_1$, allowing the separator 23 to separate the first portion 3010 from the electrode plate with a different polarity.

In preparation, two first bonding pieces 70 are bonded on predetermined positions of one end of the separator 23, and the first electrode plate 21, the separator 23, and the second electrode plate 22 are stacked and wound to obtain the electrode assembly 20, so that the two first bonding pieces 70 are opposite. Then, the plurality of first tabs 31 are stacked on each other to form the first connecting portion 301, and the first portion 3010 of the first connecting portion 301 is inserted between the two first bonding pieces 70.

Figure 10:
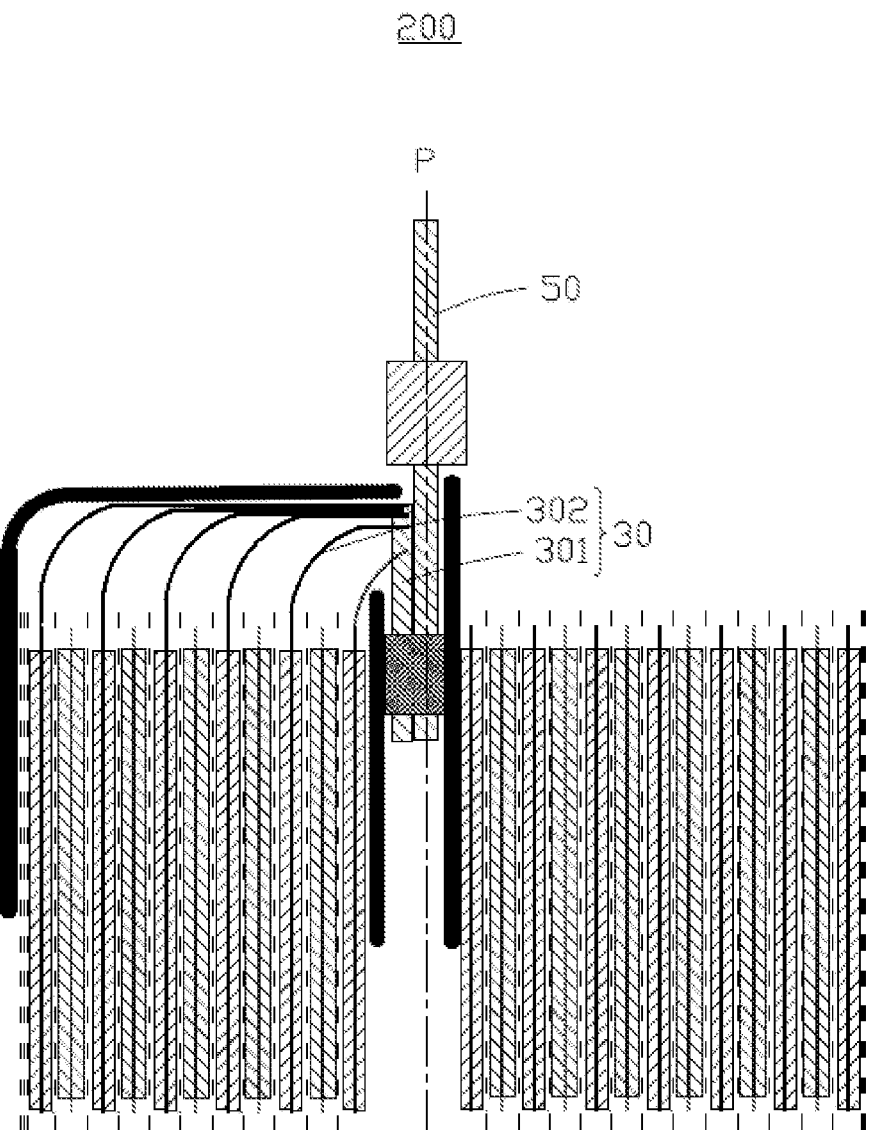
FIG. 10 is a cross-sectional view of an electrochemical apparatus according to another embodiment of this application.
Figure 10:
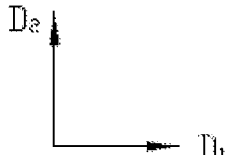

Referring to FIG. 10, another embodiment of this application further provides an electrochemical apparatus 200. A difference from the electrochemical apparatus 100 is that the first connecting portion 301 is not a U-shaped structure, but extends in the second direction $D_2$ as a whole.

Firstly, in preparation, it is only required to bend the first tab group 30 at the connection between the first connecting portion 301 and the second connecting portion 302, and the first connecting portion 301 itself does not need to be bent but is directly inserted into the two adjacent layers of the electrode plates, which can also alleviate the problem of contact short circuit due to reverse insertion of a tab. Secondly, in the first direction $D_1$, the thickness of the first connecting portion 301 is smaller, helping reduce the total thickness of the electrochemical apparatus 200, and helps reduce required thickness offset due to arrangement of the first portion 3010 between the two adjacent layers of the electrode plates. Furthermore, although the first connecting portion 301 is straight-out in this case, the first connecting portion 301 is disposed between two adjacent layers of the electrode plates, which therefore can still reduce waste of space at the head of the electrode assembly 20 and improve energy density. Thirdly, the first connecting portion 301 itself does not need to be bent, which helps to simplify the manufacturing process.

Figure 11:
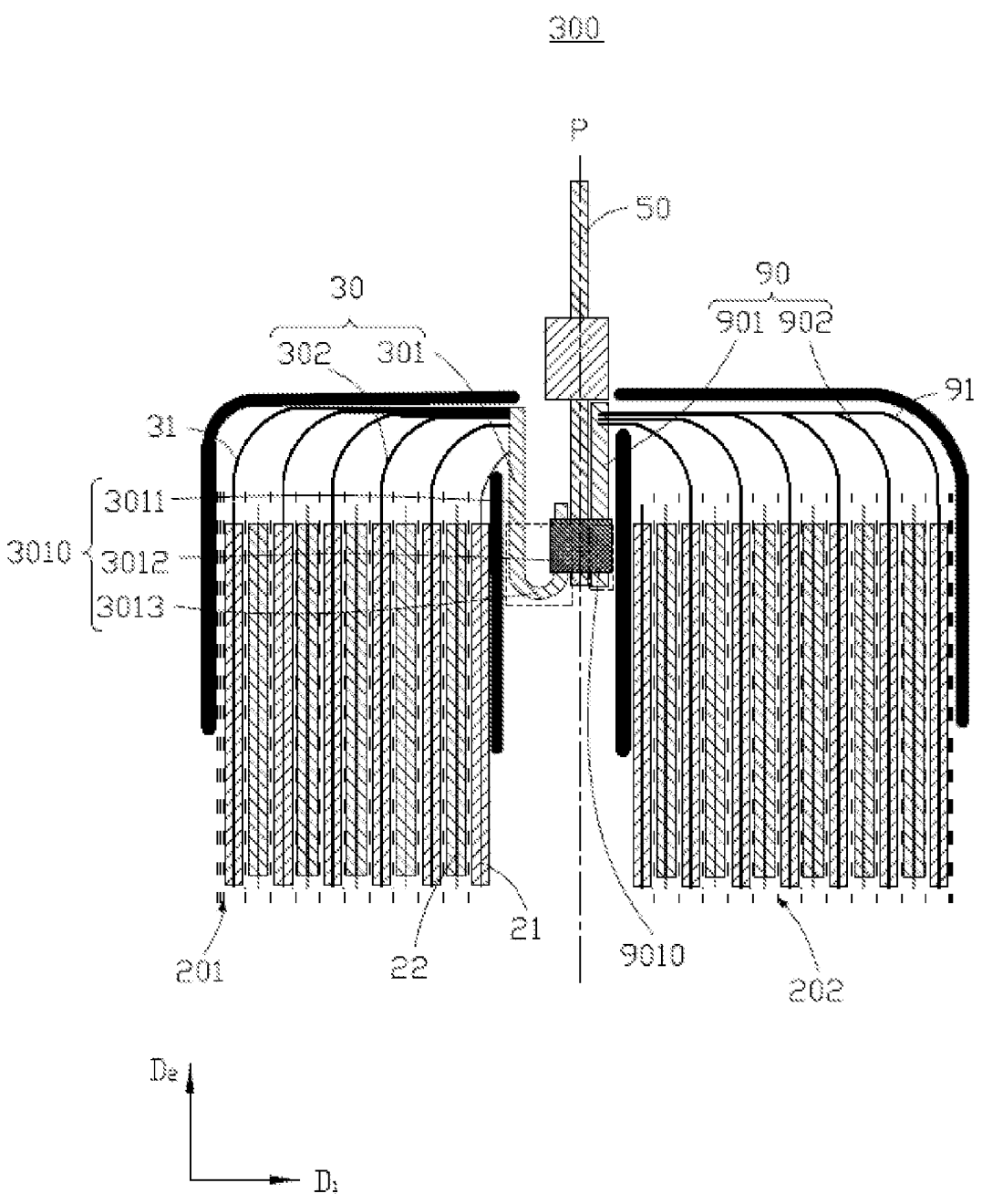
FIG. 11 is a cross-sectional view of an electrochemical apparatus according to a yet another embodiment of this application.

Referring to FIG. 11, a yet another embodiment of this application further provides an electrochemical apparatus

300. A difference from the electrochemical apparatus 100 is that the electrochemical apparatus 300 further includes a second tab group 90, and the first adapting piece 50 is electrically connected to the second tab group 90. The second tab group 90 includes a plurality of second tabs 91, and the second tabs 91 and the plurality of first tabs 31 have a same polarity: The plurality of second tabs 91 are connected to the first electrode plate 21.

The second tab group 90 includes a third connecting portion 901 and a fourth connecting portion 902. The third connecting portion 901 is connected to the first adapting piece 50, and the fourth connecting portion 902 is connected between the first electrode plate 21 and the third connecting portion 901. The plurality of second tabs 91 are stacked on each other to form the third connecting portion 901. In some embodiments, the second tabs 91 are stacked on each other and welded to form the third connecting portion 901. The third connecting portion 901 includes a second portion 9010. In the first direction $D_1$, the second portion 9010 is disposed between two adjacent layers of the electrode plates. The first adapting piece 50 is at least partially disposed between the first portion 3010 and the second portion 9010, and can both be fixed to the first portion 3010 and the second portion 9010 by welding.

In some embodiments, the second connecting portion 302 is connected to the first electrode plate 21 at the first section 201 of the electrode assembly 20. The fourth connecting portion 902 is connected to the first electrode plate 21 at the second section 202 of the electrode assembly 20. In other words, the electrode assembly 20 is of a full-tab structure. With addition of second tabs 91 to connect to the first electrode plate 21 at the second section 202, the number of tabs connected to the first electrode plate 21 is further increased, helping further reduce internal resistance of the first electrode plate 21 and improve charge and discharge rates of the electrochemical apparatus 300.

Further, in the first direction $D_1$, a plurality of first tabs 31 may be provided to connect to each layer of the first electrode plate 21 at the first section 201 respectively, and a plurality of second tabs 91 may be provided to connect to each layer of the first electrode plate 21 at the second section 202 respectively.

In some embodiments, the first portion 3010 includes a first sub-portion 3011, a second sub-portion 3012 opposite to the first sub-portion 3011, and a third sub-portion 3013 bent and connected between the first sub-portion 3011 and the second sub-portion 3012. In other words, the first portion 3010 forms a U-shaped structure. The third connecting portion 901 extends in the second direction $D_2$ as a whole. In this case, the first adapting piece 50 is at least partially disposed between the second sub-portion 3012 of the first portion 3010 and the second portion 9010, and can both be fixed to the second sub-portion 3012 and the third connecting portion 901 by welding.

The electrochemical apparatus 100, 200, or 300 in this application includes all apparatuses capable of electrochemical reactions. The electrochemical apparatus 100, 200, or 300 includes all kinds of primary batteries, secondary batteries, fuel batteries, solar batteries, or capacitors (for example, super capacitors). Particularly, the electrochemical apparatus 100, 200, or 300 may be a secondary lithium battery, including a secondary lithium metal battery, a secondary lithium-ion battery, a secondary lithium polymer battery, and a secondary lithium-ion polymer battery.

Figure 12:
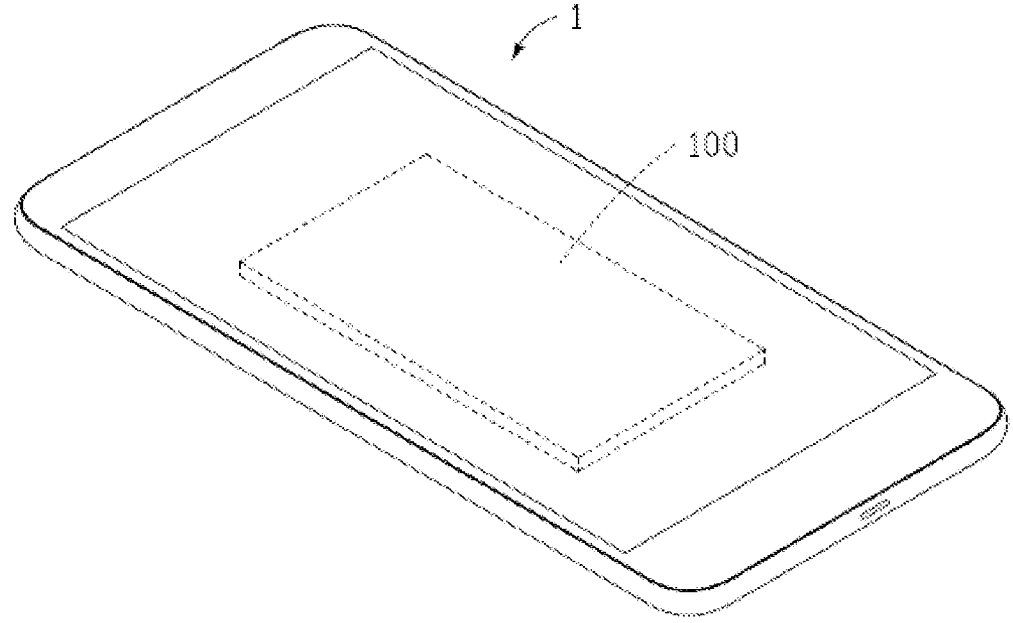
FIG. 12 is a cross-sectional view of an electronic apparatus according to an embodiment of this application.

Referring to FIG. 12, an embodiment of this application further provides an electronic apparatus 1. The electronic apparatus 1 includes the electrochemical apparatus 100 (or the electrochemical apparatus 200 or 300). The electrochemical apparatus 100, 200, and 300 of this application is applicable to the electronic apparatuses 1 in various fields. In an embodiment, the electronic apparatus 1 of this application may be, but is not limited to, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

Finally, it should be noted that the foregoing embodiments are merely intended to describe the technical solutions of this application, but not intended to constitute any limitation. Although this application is described in detail with reference to preferred embodiments, persons of ordinary skill in the art should understand that modifications or equivalent replacements can be made to the technical solutions of this application, without departing from the scope of the technical solutions of this application.

What is claimed is:

1. An electrochemical apparatus comprising: a housing, an electrode assembly disposed inside the housing, a first tab group and a first adapting piece electrically connected to the first tab group and extending out of the housing;

wherein the electrode assembly comprises electrode plates and a separator disposed between adjacent electrode plates, the electrode plates comprise a first electrode plate and a second electrode plate, and the first electrode plate, the separator, and the second electrode plate are laminated, the first tab group comprises a plurality of first tabs, and the plurality of first tabs are connected to the first electrode plate;

wherein the first tab group comprises a first connecting portion connected to the first adapting piece, the plurality of first tabs are stacked on each other to form the first connecting portion, the first connecting portion comprises a first portion, a thickness direction of the electrode assembly is defined as a first direction, and in the first direction, the first portion formed by the plurality of first tabs stacked on each other is disposed between two adjacent layers of the electrode plates.

2. The electrochemical apparatus according to claim 1, wherein the electrode assembly is of a wound structure or a stacked structure.

3. The electrochemical apparatus according to claim 2, wherein the electrode assembly is of a wound structure, a plane passing through a winding center axis of the electrode assembly and perpendicular to the first direction is defined as a winding center plane, and the first portion is disposed between two adjacent layers of the electrode plates on two sides of the winding center plane.

4. The electrochemical apparatus according to claim 3, wherein the first tab group further comprises a second connecting portion, the second connecting portion is connected between the first electrode plate and the first connecting portion, and the second connecting portion is disposed on a side of the winding center plane.

5. The electrochemical apparatus according to claim 2, wherein the electrode assembly is of a wound structure; in a winding direction, the electrode assembly comprises two bent sections and a first section disposed between the two bent sections; and in the first direction, the first portion is disposed between two adjacent layers of electrode plates of the first section.

6. The electrochemical apparatus according to claim 1, wherein the electrochemical apparatus further comprises a bonding piece, the bonding piece bonds the first portion and an electrode plate closest to the first portion in the first direction; and in the first direction, a projection of the first portion on the electrode plate closest to the first portion is located within a projection of the bonding piece on the electrode plate closest to the first portion.

7. The electrochemical apparatus according to claim 6, wherein a direction in which the plurality of first tabs extend out of the electrode plate is defined as a second direction, and in the second direction, an edge of the bonding piece extends beyond an edge of the electrode assembly.

8. The electrochemical apparatus according to claim 1, wherein in the first direction, the first portion is disposed between two adjacent layers of separators; the electrochemical apparatus further comprises a bonding piece, the bonding piece bonds the first portion and a separator closest to the first portion in the first direction; and in the first direction, a projection of the first portion on the separator closest to the first portion is located within a projection of the bonding piece on the separator closest to the first portion.

9. The electrochemical apparatus according to claim 1, wherein an electrode plate closest to the first portion in the first direction is the first electrode plate, the first electrode plate comprises a current collector and a first active material layer disposed on a surface of the first current collector, the plurality of first tabs are connected to the first current collector, the current collector comprises a first surface facing toward the first portion and a second surface back away from the first surface, the first active material layer is disposed on the first surface and the second surface, the first active material layer disposed on the first surface is provided with a recess, and in the first direction, a projection of the first portion on the first surface is located within a projection of the recess on the first surface.

10. The electrochemical apparatus according to claim 1, wherein an electrode plate closest to the first portion in the first direction is the first electrode plate, the first electrode plate comprises a first current collector and a first active material layer disposed on a surface of the first current collector, the plurality of first tabs are electrically connected to the first current collector, the first current collector comprises a first surface facing toward the first connecting portion and a second surface back away from the first surface, the first active material layer is disposed on the first surface and the second surface, a direction in which the plurality of first tabs extend out of the electrode plate is defined as a second direction; in the second direction, the first active material layer disposed on the first surface comprises a first area and a second area, and the first area is disposed between the first tab and the second area; and in the first direction, a projection of the first portion on the first surface is located within a projection of first area on the first surface.

11. The electrochemical apparatus according to claim 1, wherein the first portion is configured to be a U-shaped structure, and at least a part of the first adapting piece is disposed in a space constrained by the U-shaped structure.

12. The electrochemical apparatus according to claim 1, wherein a direction in which the plurality of first tabs extend out of the electrode plate is defined as a second direction, and the first connecting portion extends in the second direction.

13. The electrochemical apparatus according to claim 1, wherein the electrochemical apparatus further comprises a second tab group, the first adapting piece is electrically connected to the second tab group, the second tab group comprises a plurality of second tabs, and the plurality of second tabs are connected to the first electrode plate; and the second tab group comprises a third connecting portion connected to the first adapting piece, the plurality of second tabs are stacked on each other to form the third connecting portion, the third connecting portion comprises a second portion, in the first direction, the second portion is disposed between two adjacent layers of the electrode plates, and at least a part of the first adapting piece is disposed between the first portion and the second portion.

14. The electrochemical apparatus according to claim 1, wherein the electrochemical apparatus is a pouch cell battery.

15. An electronic apparatus, comprising an electrochemical apparatus, wherein the electrochemical apparatus comprises: a housing, an electrode assembly disposed inside the housing, a first tab group and a first adapting piece electrically connected to the first tab group and extending out of the housing;

wherein the electrode assembly comprises electrode plates and a separator disposed between adjacent electrode plates, the electrode plates comprise a first electrode plate and a second electrode plate, and the first electrode plate, the separator, and the second electrode plate are laminated, the first tab group comprises a plurality of first tabs, and the plurality of first tabs are connected to the first electrode plate;

wherein the first tab group comprises a first connecting portion connected to the first adapting piece, the plurality of first tabs are stacked on each other to form the first connecting portion, the first connecting portion comprises a first portion, a thickness direction of the electrode assembly is defined as a first direction, and in the first direction, the first portion formed by the plurality of first tabs stacked on each other is disposed between two adjacent layers of the electrode plates.

16. The electronic apparatus according to claim 15, wherein the electrode assembly is of a wound structure, a plane passing through a winding center axis of the electrode assembly and perpendicular to the first direction is defined as a winding center plane, and the first portion is disposed between two adjacent layers of the electrode plates on two sides of the winding center plane.

17. The electronic apparatus according to claim 15, wherein the electrode assembly is of a wound structure; in a winding direction, the electrode assembly comprises two bent sections and a first section disposed between the two bent sections; and in the first direction, the first portion is disposed between two adjacent layers of electrode plates of the first section.

18. The electronic apparatus according to claim 15, wherein the electrochemical apparatus further comprises a bonding piece, the bonding piece bonds the first portion and an electrode plate closest to the first portion in the first direction; and in the first direction, a projection of the first portion on the electrode plate closest to the first portion is located within a projection of the bonding piece on the electrode plate closest to the first portion.

19. The electronic apparatus according to claim 18, wherein a direction in which the plurality of first tabs extend out of the electrode plate is defined as a second direction, and in the second direction, an edge of the bonding piece extends beyond an edge of the electrode assembly.

20. The electronic apparatus according to claim 15, wherein in the first direction, the first portion is disposed between two adjacent layers of separators; the electrochemical apparatus further comprises a bonding piece, the bonding piece bonds the first portion and a separator closest to the first portion in the first direction; and in the first direction, a projection of the first portion on the separator closest to the first portion is located within a projection of the bonding piece on the separator closest to the first portion.

* * * * *